(12) United States Patent
Yang et al.

(10) Patent No.: US 10,078,780 B2
(45) Date of Patent: Sep. 18, 2018

(54) GESTURE RECOGNITION MECHANISM (71) Applicant: Intel Corporation, Santa Clara, CA (US)

(72) Inventors: Xue Yang, Arcadia, CA (US); Sridhar G. Sharma, Milpitas, CA (US); Prasanna Singamsetty, San Jose, CA (US); Lakshman Krishnamurthy, Portland, OR (US); Ke Ding, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/671,227

(22) Filed: Mar. 27, 2015

(65) Prior Publication Data

US 2016/0283783 A1 Sep. 29, 2016

(51) Int. Cl.
*G06K 9/00* (2006.01)
*G06K 9/62* (2006.01)
*G06F 3/01* (2006.01)
*G06N 3/04* (2006.01)

(52) U.S. Cl.
CPC ..... *G06K 9/00335* (2013.01); *G06K 9/00342* (2013.01); *G06K 9/6202* (2013.01); *G06F 3/01* (2013.01); *G06K 9/6267* (2013.01); *G06N 3/0454* (2013.01)

(58) Field of Classification Search
CPC ........ G06F 3/017; G06F 1/163; G06F 3/0346; G06F 2203/04808; G06K 9/00389; G06K 9/00335; G06K 9/6202; G06K 9/00342; G06K 9/6232; G06K 9/6267; G06N 3/0454; G06N 3/082
See application file for complete search history.

(56) References Cited

U.S. PATENT DOCUMENTS

| | | | | |
|---|---|---|---|---|
| 5,239,594 A | * | 8/1993 | Yoda | G06K 9/6272 382/158 |
| 2011/0041100 A1 | * | 2/2011 | Boillot | G06F 3/011 715/863 |
| 2012/0272194 A1 | * | 10/2012 | Yang | G06F 3/017 715/863 |
| 2012/0323521 A1 | * | 12/2012 | De Foras | G06F 3/017 702/141 |
| 2013/0039591 A1 | * | 2/2013 | De Muelenaere | G06K 9/44 382/224 |
| 2015/0077322 A1 | * | 3/2015 | Mittal | G06F 3/017 345/156 |
| 2015/0177842 A1 | * | 6/2015 | Rudenko | G06F 3/017 345/156 |
| 2015/0370332 A1 | * | 12/2015 | Evrard | G06F 3/017 715/863 |

FOREIGN PATENT DOCUMENTS

WO WO 2014090754 A1 * 6/2014 ............ G06F 3/017

* cited by examiner

*Primary Examiner* — Kenny Cese
(74) *Attorney, Agent, or Firm* — Womble Bond Dickinson (US) LLP (57) ABSTRACT

A method is described including storing reference vector data corresponding to user gestures at a plurality of neurons at pattern matching hardware, receiving real time signals from the sensor array and performing gesture recognition using the pattern matching hardware to compare incoming vector data corresponding to the real time signals with the reference vector data.

21 Claims, 7 Drawing Sheets

| Gesture Enrolled by EE | Positive Test | Negative Test | Overall Pass Rate |
|---|---|---|---|
| hk_R | 9/9 | 5/5 | = 14/14 |
| left_flick | 10/10 | 9/11 | = 19/21 |
| lly_circle | 14/14 | 5/5 | = 19/19 |
| right_flick | 10/10 | 5/5 | = 15/15 |
| xwan130_M | 10/10 | 5/5 | = 15/15 |
| xwan130_leftflick | 8/10 | 14/14 | = 22/24 |
| xwan130_rollleft | 10/10 | 4/5 | = 14/15 |
| xwan130_slight_pitch | 10/10 | 5/5 | = 15/15 |
| xwan130_three | 9/10 | 5/5 | = 14/15 |
| Total | 100/103 ≈ 97.1% | 62/65 ≈ 95.4% | 162/168 ≈ 96.4% |

GESTURE RECOGNITION MECHANISM

FIELD

Embodiments described herein generally relate to wearable computing. More particularly, embodiments relate to identifying gestures using a wearable device.

BACKGROUND

Modern clothing and other wearable accessories may incorporate computing or other advanced electronic technologies. Such computing and/or advanced electronic technologies may be incorporated for various functional reasons or may be incorporated for purely aesthetic reasons. Such clothing and other wearable accessories are generally referred to as "wearable technology" or "wearable computing devices."

Wearable devices often include Small ForFm actor (SFF) devices, which are becoming prevalent for enabling users to accomplish various tasks while on the go. However, as SFF devices become smaller typical input/output (I/O) interfaces (e.g., keyboard and/or mouse) have become impracticable. Thus, speech or gesture commands may be implemented to interact with SFF computing devices to overcome interface problems. A gesture is defined as any type of movement of part of the body (e.g., a hand, head, facial expression, etc.) to express an idea or meaning. Moreover, SFF devices need to operate at ultralow power. Hence, gesture recognition needs to be implemented with low computation and low power consumption.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Embodiments may be embodied in systems, apparatuses, and methods for gesture recognition, as described below. In the description, numerous specific details, such as component and system configurations, may be set forth in order to provide a more thorough understanding of the present invention. In other instances, well-known structures, circuits, and the like have not been shown in detail, to avoid unnecessarily obscuring the present invention.

Embodiments provide for a gesture recognition mechanism that implements a pattern matching algorithm that uses a temporal gradient sequence of sensor data (e.g., an accelerometer and/or gyroscope) to determine a signature that is unique for a user gesture. In such an embodiment, classifications use generic pattern matching algorithms that can be mapped to a generic pattern matching hardware block, which provides enhanced computation efficiency. Further, the pattern matching algorithm enables training of a set of customized gestures, and can be applied to different types of gestures (e.g., hand gesture, head gesture, body gesture, etc.). Accordingly, each user can define a customized set of gestures and train a device to recognize the user's own gesture set using a small number of training samples. For example, when wearing a smart watch, the user uses a hand to draw a circle. The circle drawing motion defines a specific gesture. In a different example, the user can shake or nod the head when wearing a headset. The nodding or shaking of the head defines a gesture. Thus, the pattern matching algorithm utilizes an accelerator and/or gyroscope on the watch or headset to capture and recognize the instantaneous gesture the user can perform at any time.

Other embodiments provide for a gesture recognition mechanism that implements a scale invariant algorithm. The scale invariant algorithm implements the pattern matching hardware that performs a Scale-Invariant Feature Extraction (SIFE) process to enable user-defined gesture recognition. The scale invariant algorithm improves recognition accuracy through the use of matching of scale-invariant features between template and input gesture, without using a dynamic time warping (DTW) searching matrix. Additionally, the scale invariant mechanism supports a quality indicator for a new enrolled gesture by checking its distance to the existing distance in templates. The distance based gesture recognition is powered by the pattern matching hardware that performs parallel recognition.

According to one embodiment, the scale invariant algorithm finds proper alignments between two different gesture sequences despite temporal and magnitude variations. This is achieved by finding most significant scale-invariant feature points and performing one-on-one mapping between input gesture and template gesture sequences, performing segment based resampling between feature points for input gesture and using the pattern matching hardware to determine the closest gesture in the enrolled gesture decision space.

Figure 1:
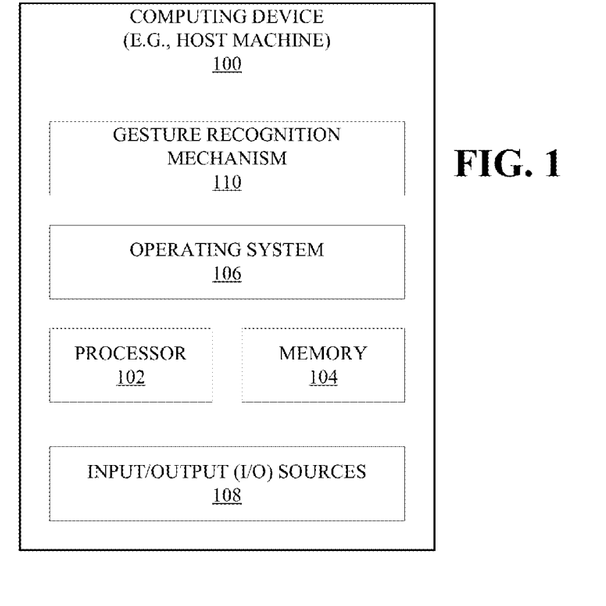
FIG. 1 illustrates a gesture recognition mechanism at a computing device according to one embodiment.

FIG. 1 illustrates a gesture recognition mechanism 110 at a computing device 100 according to one embodiment. In one embodiment, computing device 100 serves as a host machine for hosting gesture recognition mechanism ("recognition mechanism") 110 that includes a combination of any number and type of components for facilitating dynamic identification of gestures at computing devices, such as computing device 100. In one embodiment, computing device 100 includes a wearable device. Thus, implementation of recognition mechanism 110 results in computing device 100 being an assistive device to identify gestures of a wearer of computing device 100.

In other embodiments, gesture recognition operations may be performed at a computing device 100 including large computing systems, such as server computers, desktop computers, etc., and may further include set-top boxes (e.g., Internet-based cable television set-top boxes, etc.), global positioning system (GPS)-based devices, etc. Computing device 100 may include mobile computing devices, such as cellular phones including smartphones (e.g., iPhone® by Apple®, BlackBerry® by Research in Motion®, etc.), personal digital assistants (PDAs), tablet computers (e.g., iPad® by Apple®, Galaxy 3® by Samsung®, etc.), laptop computers (e.g., notebook, netbook, Ultrabook™, etc.), e-readers (e.g., Kindle® by Amazon®, Nook® by Barnes and Nobles®, etc.), etc.

Computing device 100 may include an operating system (OS) 106 serving as an interface between hardware and/or physical resources of the computer device 100 and a user. Computing device 100 may further include one or more processors 102, memory devices 104, network devices, drivers, or the like, as well as input/output (I/O) sources 108, such as touchscreens, touch panels, touch pads, virtual or regular keyboards, virtual or regular mice, etc.

Figure 2:
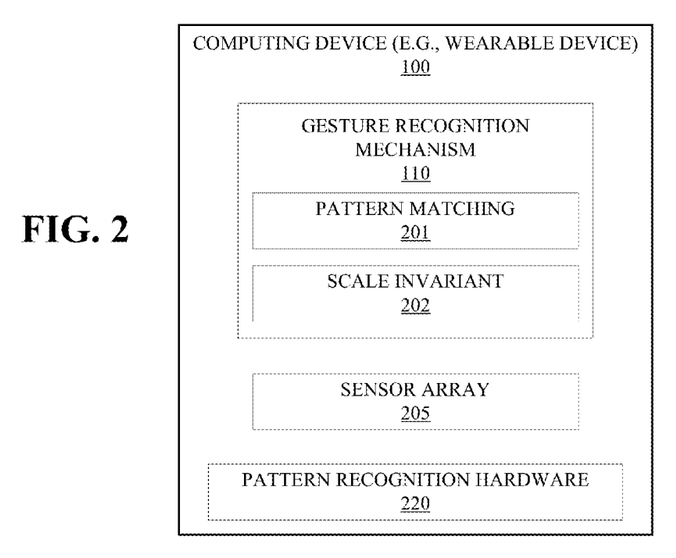
FIG. 2 illustrates one embodiment of a gesture recognition mechanism.

FIG. 2 illustrates a gesture recognition mechanism 110 employed at computing device 100. In one embodiment, gesture recognition mechanism 110 may include any number and type of components, such as a pattern matching mechanism 201 and scale invariant mechanism 202. In embodiments, gesture recognition mechanism 110 receives input data from sensor array 205. In one embodiment, sensor array 205 includes an accelerometer and a gyroscope.

However in further embodiments, sensor array 205 may include an image capturing device, such as a camera. Such a device may include various components, such as (but are not limited to) an optics assembly, an image sensor, an image/video encoder, etc., that may be implemented in any combination of hardware and/or software. The optics assembly may include one or more optical devices (e.g., lenses, mirrors, etc.) to project an image within a field of view onto multiple sensor elements within the image sensor. In addition, the optics assembly may include one or more mechanisms to control the arrangement of these optical device(s). For example, such mechanisms may control focusing operations, aperture settings, exposure settings, zooming operations, shutter speed, effective focal length, etc. Embodiments, however, are not limited to these examples.

Sensory array 205 may further include one or more image sensors including an array of sensor elements where these elements may be complementary metal oxide semiconductor (CMOS) sensors, charge coupled devices (CCDs), or other suitable sensor element types. These elements may generate analog intensity signals (e.g., voltages), which correspond to light incident upon the sensor. In addition, the image sensor may also include analog-to-digital converter(s) ADC(s) that convert the analog intensity signals into digitally encoded intensity values. Embodiments, however, are not limited to these examples. For example, an image sensor converts light received through optics assembly into pixel values, where each of these pixel values represents a particular light intensity at the corresponding sensor element. Although these pixel values have been described as digital, they may alternatively be analog. As described above, the image sensing device may include an image/video encoder to encode and/or compress pixel values. Various techniques, standards, and/or formats (e.g., Moving Picture Experts Group (MPEG), Joint Photographic Expert Group (JPEG), etc.) may be employed for this encoding and/or compression.

In a further embodiment, sensor array 205 may include other types of sensing components, such as context-aware sensors (e.g., myoelectric sensors, temperature sensors, facial expression and feature measurement sensors working with one or more cameras, environment sensors (such as to sense background colors, lights, etc.), biometric sensors (such as to detect fingerprints, facial points or features, etc.), and the like.

Figure 3:
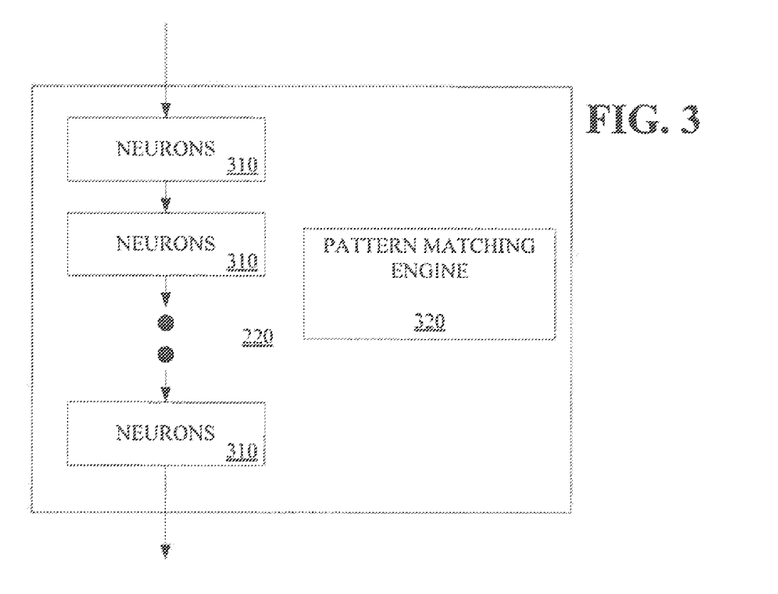
FIG. 3 illustrates one embodiment of pattern matching hardware.

In embodiments, gesture recognition mechanism 110 implements pattern matching hardware 205 to perform gesture recognition. In one embodiment, pattern matching hardware 205 is implemented using a CM1K pattern recognition integrated circuit developed by CogniMem Technologies®, Inc. However, other embodiments may be implemented using other integrated circuits. FIG. 3 illustrates one embodiment of pattern matching hardware 220, which includes neurons 310 and pattern matching engine 320. A neuron 310 is an associative memory that can autonomously compare an incoming pattern with its reference pattern. In such an embodiment, a neuron 310 autonomously evaluates a distance between an incoming vector and a reference vector stored in its memory. If the distance falls within its current influence field, a positive classification is returned. During the classification of an input vector, sorting/ranking among all neurons 310 are performed to find which one has the best match. Pattern matching engine 320 receives vector data and broadcasts the vector data to neurons 310. In a further embodiment, pattern matching engine 320 returns a best-fit category received from neurons 310.

Pattern Matching

Referring back to FIG. 2, pattern matching mechanism 201 uses a temporal gradient sequence of sensor array 205 data (e.g., accelerometer and gyroscope) to determine a signature that is unique for a user gesture. Thus, a pattern matching algorithm may be implemented, using the temporal gradient sequence, to train a pattern matching classifier or neural network for gesture recognition. According to one embodiment, pattern matching hardware 220 is implemented to perform the pattern matching algorithm.

Figure 4:
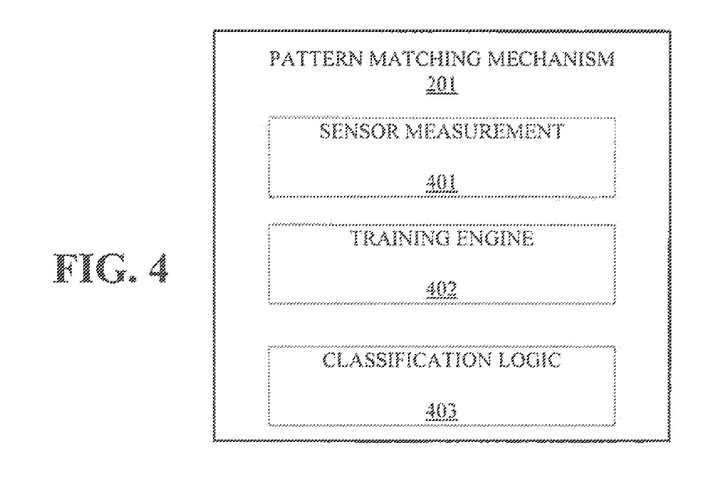
FIG. 4 illustrates one embodiment of a pattern matching mechanism.

FIG. 4 illustrates one embodiment of pattern matching mechanism 201. According to one embodiment, pattern matching mechanism 201 includes sensor measurement module 401, training engine 402 and classification logic 403. Sensor measurement module 401 records data from sensor array 205. In one embodiment, sensor measurement module 401 records raw three-axis accelerometer and three-axis gyroscope data at a predetermined sampling frequency (e.g., 100 Hz).

According to one embodiment, sensor measurement module 401 performs measurements of sensor amplitude, two-dimension projection, and three-dimension (3D) sensor readings based on the specific computing device 100. In such an embodiment, amplitude measurement uses one-dimension (1D) accelerometer and 1D gyroscope data, resulting in total two-dimensional (2D) measurements per time sample. The 1D amplitude is a rotation invariant scalar quantity, which is beneficial since the algorithm is not affected by the orientation change of the device when performing the gesture (e.g., user can draw the circle gesture while tilting/rotating his/her wrist at different angles). Thus, the 1D amplitude is suitable for wristband, watch, or ring type of wearable devices.

For 2D projection, the accelerometer and gyroscope raw sensor readings are projected into a horizontal plane and a vertical plane, resulting in total four-dimensional (4D) measurements per time sample. Through 2D projection, the device 100 movements at different tilt angles can be differentiated while it is agnostic to the yaw angles in the horizontal plane. In order to perform 2D projection, the device 100 pitch and roll angles are implemented. In one embodiment, the pitch and roll angles are derived through the gravity vector measured by the accelerometer as long as the linear acceleration is negligible. 2D projection can be suitable for wearable devices such as arm band, footwear, etc.

For the 3D raw sensor reading, 3D raw sensor readings are used without rotation translation, resulting in total six-dimensional (6D) measurements per time sample (3D accelerometer and 3D gyroscope). 3D sensor readings are not translated from a sensor frame to a global reference coordinate frame because the magnetic distortions at different locations may result in large errors in yaw angle estimation, which can lead to misrepresentation of gesture data. 3D data is suitable for the cases where gestures performed at different attitude and yaw angles need to be differentiated and treated as different gestures. For example, 3D data is suitable for headset sensors.

As shown above, the amplitude method results in total 2D measurements per time sample (e.g., 1 from accelerometer and 1 from gyroscope); the 2D projection method results in total 4 dimensional measurements per time sample (e.g., 2 from accelerometer and 2 from gyroscope); and the 3D method results in total 6D measurements per time sample (e.g., 3 from accelerometer and 3 from gyroscope). According to one embodiment s is used to represent 1D measurement regardless of the type of sensor measurements used. Although the below descriptions focus on 1D measurement, the generalization from 1D to 2D, 4D or 6D measurements are straightforward.

Training engine 402 performs gestural training by implementing an algorithm that identifies the response of one or more sensors in sensor array 205 due to a body gesture. In one embodiment, training is implemented upon a user selecting (e.g., pushing) start/stop buttons to start/end performing one gesture during the training process. For each 1D measurement, samples $N^g_1$, $N^g_2$, ... and $N^g_k$ are assumed as the results of the 1st, 2nd, ... and Kth training of the $g^{th}$ gesture.

Figure 5:
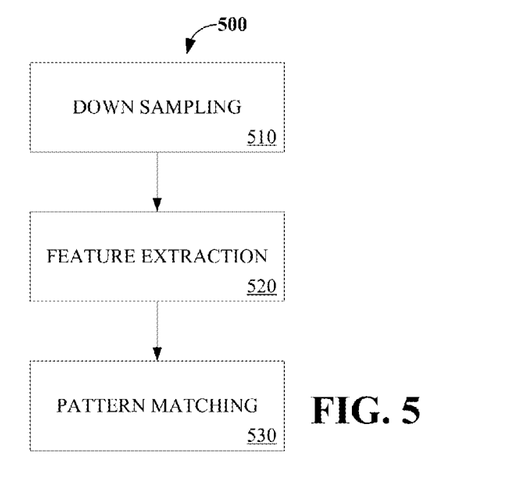
FIG. 5 is a flow diagram illustrating one embodiment of a training process.

FIG. 5 is a flow diagram illustrating one embodiment of a training process 500 performed by training engine 402. Process 500 may be performed by processing logic that may comprise hardware (e.g., circuitry, dedicated logic, programmable logic, etc.), software (such as instructions run on a processing device), or a combination thereof. In one embodiment, method 500 may be performed by pattern matching mechanism 201. The methods of process 500 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

At processing block 510, down sampling is performed. One issue that occurs during the training stage is that user can perform the same gesture at different speeds. Additionally, some gestures are long, while others are short. Thus, down sampling is performed in order to equalize the training sample sizes across all gestures. In order to deal with different speeds of performing the same gesture, training speed differences are allowed within two fold. In one embodiment, gesture training performed outside of a two times (2×) speed range is considered to be unsuccessful, resulting in the user being asked to re-perform the training. Thus, $N^g_{min}$=min($N^g_1$, $N^g_2$, ... $N^g_k$), and $N^g_{max}$=max($N^g_1$, $N^g_2$, ... $N^g_k$). $N^g_{min}$<$N^g_{max}$/2, then the training fails, and the user is asked to re-perform the training of the $g^{th}$ gesture.

In a further embodiment, the total number of gestures the user defines is G, and $N^1_{max}$, $N^2_{max}$, ..., $N^G_{max}$ is the max sample numbers for the 1st, 2nd, and the $G^{th}$ gesture. Further $N_s$=min ($N^1_{max}$, $N^2_{max}$, ..., $N^G_{max}$)/2. To equalize the training sample size the sample size of each training data is reduced to $N_s$ samples through down sampling after applying anti-alias low pass filtering. Specifically, for the $k^{th}$ training of the gth gesture, there are $N^g_k$ samples. Thus, gs=$N^g_k$/$N_s$. The samples with index of round(gs*i), where i=1, 2, ..., $N_s$, will be added to the output dataset.

Subsequently, smoothing is performed in which a smoothing window size W is defined. In one embodiment, the average value of every W samples will be used as the final output of the smoothed training dataset. Thus, the resulting training dataset includes $N_s$/W samples for each gesture, which is represented as $s_1$, $s_2$, ..., $s_{Ns}$/W.

At processing block 520, gesture feature extraction is performed. Given one dimensional sensor measurements, the differences between consecutive samples are computed as gesture features. That is, given $s_1$, $s_2$, ..., $s_{Ns/W}$ samples, the corresponding features are $f_{s1}$=s2−s1, $f_{s2}$=s3−s2, $fs_{(Ns/W-1)}$=$s_{Ns/W}$−$s_{Ns/W-1}$. At processing block 530, pattern matching classifier training is performed. Given the dimension of sensor measurements (D) and the number of temporal samples per gesture ($N_s$/W−1), each gesture is represented by D*($N_s$/W−1) dimensional data (e.g., a vector of D*($N_s$/W−1) dimension represents a gesture).

According to one embodiment, a pattern matching algorithm is applied based on a distance L1 norm (e.g., manhattan distance) or distance L2 norm (e.g., euclidean distance) to train the classifier. In such an embodiment, the training of a pattern matching classifier is to calculate a pairwise distance (L1 or L2) of training vectors in order to find a set of reference vectors $Ref_i$ and their corresponding influence area to represent the entire decision space. According to one embodiment, pattern matching hardware 220 is implemented to perform the pattern matching algorithm. However, other embodiments may be implemented in software.

In one embodiment, each neuron 310 in pattern matching hardware 220 stores n dimensional reference feature vector, and has an influence area depending on the L1 or L2 distance with the nearest neurons. Given a new data instance, if the distance to a neuron 310 is less than its influence area, then the new data instance is labeled with the same category of the corresponding neuron. When training pattern matching hardware 220, a new neuron 310 is added if a new training data instance is unrecognizable or has ambiguity (e.g., no unique category has been identified). At the end of the training process, a set of neurons 310 will be produced given the training data, with each storing a reference feature vector for its corresponding category and has an influence area as defined by L1 or L2 distance.

For each training instance of one gesture, a vector of D*($N_s$/W−1) dimension represents the particular training instance. With each new training instance, the D*(Ns/W−1) dimension vector is received at the classifier (e.g., pattern matching hardware 220) as training data. For example, each training data vector dimensional is 300 when using 3D sensor measurements (D=6), and sample length of 50 ($N_s$/W−1=50). If eight instances of training data for each gesture are implemented (eleven gestures in total), an eighty eight total of training data is fed into pattern matching hardware 220. Accordingly, the output of pattern matching hardware 220 will produce a set of neurons 310 ($Ref_i$).

In one embodiment, each neuron 310 is placed at a certain point in the D*(Ns/W−1) dimensional space, and covers an influence area defined by L1 or L2 distance. Based on the previously described example, one of the simulation results use 11 gestures and 8 training instances per gesture. The pattern matching hardware 220 training generates 41 neurons in order to cover the decision space represented by the training data, with each neuron 310 having its own influence area.

Once the classifier has been trained, classification logic 403 performs a classification stage. In one embodiment, gesture recognition and classification are enabled at any time without user input (e.g., a user does not have to provide a hint as to when a gesture has to be performed). In such an embodiment, filtering of candidate gesture patterns and gesture classification can be simultaneously accomplished due to the low cost of performing pattern matching.

Figure 6:
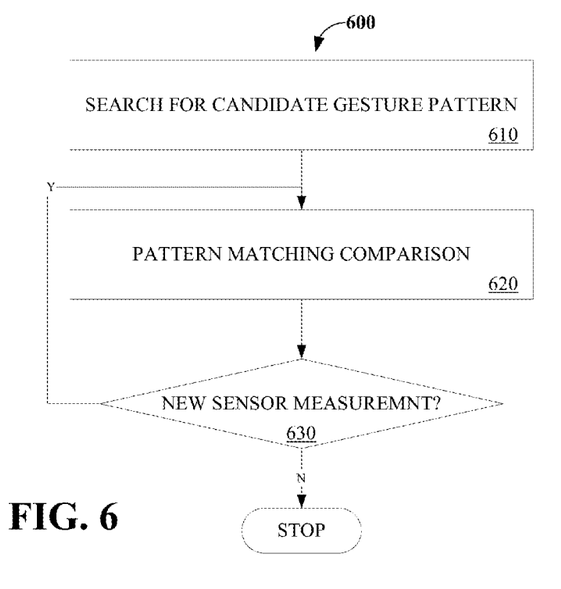
FIG. 6 is a flow diagram illustrating one embodiment of a classification process.

FIG. 6 is a flow diagram illustrating one embodiment of a classification process 600 performed by classification logic 403. Process 600 may be performed by processing logic that may comprise hardware (e.g., circuitry, dedicated logic, programmable logic, etc.), software (such as instructions run on a processing device), or a combination thereof. In one embodiment, method 600 may be performed by pattern matching mechanism 201. The methods of process 600 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-5 are not discussed or repeated here.

At processing block 610, a search for a candidate gesture pattern is performed. In one embodiment, it is not known when a user will begin a gesture. Moreover, sample lengths of gestures can vary in each time the user performs the same gesture, and can vary from one gesture to another. Therefore, the search is performed to find the candidate gesture patterns before gesture classification is performed. According to one embodiment, the search for candidate gesture patterns and classification are performed in one step.

Whenever a new sensor measurement s(t) is detected, a range of measurement windows is tested to verify whether any of the measurement windows match a gesture reference vectors (e.g., represented by neurons in pattern matching hardware 220). As discussed above, G is the total number of gestures trained by the user, and $N^1_{min}, N^2_{min}, \ldots, N^G_{min}$ are the min sample numbers from the 1st, 2nd, and the Gth gesture training. Also, $N^1_{max}, N^2_{max}, \ldots, N^G_{max}$ are the max sample numbers from the 1st, 2nd, and the Gth gesture training. Thus, $G_{min}=\min(N^1_{min}, N^2_{min}, \ldots, N^G_{min})$, and $G_{max}=\max(N^1_{max}, N^2_{max}, \ldots, N^G_{max})$.

With s(t) established as the current sensor measurement, s(0) is the first sensor measurement in the classification stage. In one embodiment, a range of measurement windows is tested for any $t \geq G_{max}$. More specifically, $index_1=t-G_{max}+1$. Thus, a measurement window $m_1=\{s(index_1), s(index_1+1), \ldots, s(t)\}$ with sample length of $G_{max}$; measurement window $m_2=\{s(index_1+1), s(index_1+2), \ldots, s(t)\}$ with sample length of $G_{max}-1$; and so on. There are in total $L=G_{max}-G_{min}$ different measurement windows, where the last measurement window $m_L=\{s(index_1+G_{max}-G_{min}), s(index_1+G_{max}-G_{min}+1), \ldots, s(t)\}$ with sample length of $G_{min}$.

In one embodiment, all L measurement windows are down sampled to $N_s$ samples. That is, an anti-alias low pass filter is first applied. Subsequently, the measurement with index of round (gs*i), where gs=length(mL)/Ns and i=1, 2, \ldots, $N_s$ for the mL measurement window, is added to the corresponding output dataset. Followed by the down sampling, a smoothing window size of W to each dataset is applied, where the average of every W samples is to be used as the final sample of the smoothed dataset. The resulting test dataset includes $N_s/W$ samples for each measurement window tested, which we represent as $cs_1, cs_2, \ldots, cs_{Ns/W}$.

At processing block 620, a pattern matching comparison is performed. In one embodiment, pattern matching comparison includes computing differences between consecutive samples as gesture features for test windows of each dimensional measurement. For instance, given $cs_1, cs_2, \ldots, cs_{Ns/W}$ samples, the corresponding features are $cf_{s1}=cs_2-cs_1$, $cfs_2=cs_3-cs_2, \ldots, cf_{s(Ns/W-1)}=cs_{Ns/W}-cs_{Ns/W-1}$. Subsequently, vector formation is tested.

Given the dimension of sensor measurements (D) and $(N_s/W-1)$ features per dimension, a vector C of $D*(N_s/W-1)$ dimension represents a testing measurement window data. In one embodiment, the testing vector C is compared with all gesture reference vectors $Ref_i$ (e.g., the center vector of all neurons 310) to determine classification. Classification is based on an influence area of each reference vector, such that $Dist_i$ represents the L1 or L2 distance between the testing vector C and the reference vector $Ref_i$. If $Dist_i$ is less than the influence area of $Ref_i$, testing vector C is classified as the same gesture represented by $Ref_i$.

Classification is based on the nearest neighbor among reference vectors. For instance, $Dist_i$ represents the L1 or L2 distance between the testing vector C and the reference vector Refi. If $Dist_i$ is the minimum compared with the distance with all other reference vectors, then testing vector C is classified as the same gesture represented by $Ref_i$.

At decision block 630, a determination is made as to whether a new sensor measurement has been detected. If so control is returned to processing block 620 where a pattern matching comparison is again performed. The above-described pattern matching comparisons are repeated each time a new sensor measurement is detected. The process is completed once pattern matching is performed for all sensor measurements.

Scale Invariant

Referring back to FIG. 2, scale invariant mechanism 202 implements pattern matching hardware 220 to perform a Scale-Invariant Feature Extraction (SIFE) process to enable user-defined gesture recognition. According to one embodiment, scale invariant mechanism 202 finds feature points from input gesture sensor samples that is invariant to time and/or magnitude domain scaling. Subsequently, scale invariant mechanism 202 selects the most significant scale-invariant feature points and performs one-on-one mapping between template gesture and the input gesture. Scale invariant mechanism 202 then performs segment-based resampling on each of the one-on-one mapped sensor sample segment to obtain a normalized gesture vector with the scale-invariant feature points matched with template. In one embodiment, pattern matching hardware 220 includes all neurons derived from all of the enrolled gestures, which will be used to further determine which the closest gesture is in its decision space.

Figure 7:
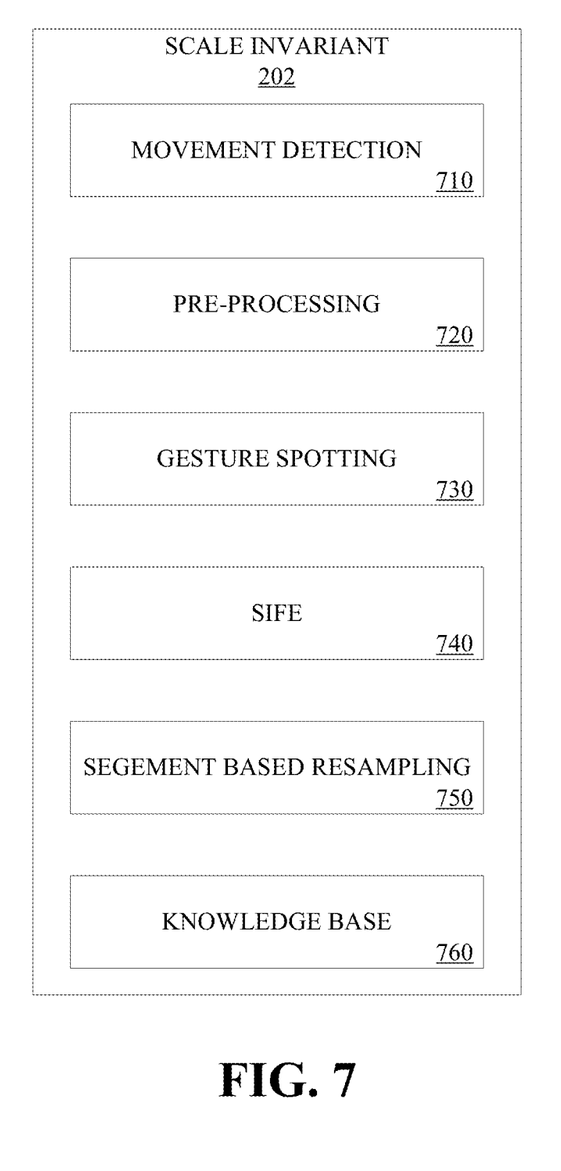
FIG. 7 illustrates one embodiment of a scale invariant mechanism.

FIG. 7 illustrates one embodiment of scale invariant mechanism 202. Scale invariant mechanism 202 includes movement detection module 710, pre-processing module 720, gesture spotting module 730, SIFE module 740, segment based resampling module 750 and knowledge base 760. In this embodiment, pattern matching hardware 220 stores n dimensional reference feature vectors in neurons 310. The classification of gestures can be performed by computing the distance (e.g., L1 or L2 distance) from the input normalized gesture to each of the neurons 310 and returning a neuron category ID that has the closest distance.

Movement detection module 710 uses a sensor sample to perform energy based movement detection for a time window. In one embodiment, movement detection module 710 will not trigger a gesture recognition process if movement does not exceed a predetermined threshold value. Pre-processing module 720 computes a magnitude from 3 axis (x, y, z) raw data and applies common signal pre-processing techniques (e.g., low pass filter, energy-based start and stop point detection, and time domain normalization) to match a gesture template size. In one embodiment, 100 Hz*2 sec=200 samples are used for a given gesture, assuming a common gesture duration is within 2 sec.

Gesture spotting module 730 determines whether certain sensor samples perform like a gesture instead of other random movement or activity. If not, gesture spotting module 730 will not trigger the subsequent modules. SIFE module 740 extracts scale-invariant feature points from the input gesture. In one embodiment, the peak and valley points of sensor magnitude samples are detected and used as the scale-invariant feature points since they will not generally change if time and/or magnitude is being used to scale for a gesture.

Segment based resampling module 750 receives the detected peak and valley points and chooses the most significant feature points to be used as one-on-one mapping with the related feature points in gesture template. Segment based resampling module 750 then performs a resample for each of the mapped segments so that the input gesture is normalized to be the same length as the template gesture. According to one embodiment, the normalized input gesture is fed into pattern matching hardware 120. Knowledge base 760 includes all enrolled gestures as templates, which are provided to pattern matching hardware 120 to train the neurons 310. Pattern matching hardware 120 computes the L2 distance of the input vector (e.g., the normalized gesture sample) to each of the neurons 310. In one embodiment, the output of pattern matching hardware 120 is the matched neuron and a corresponding category ID (e.g., the recognized gesture).

Figure 8:
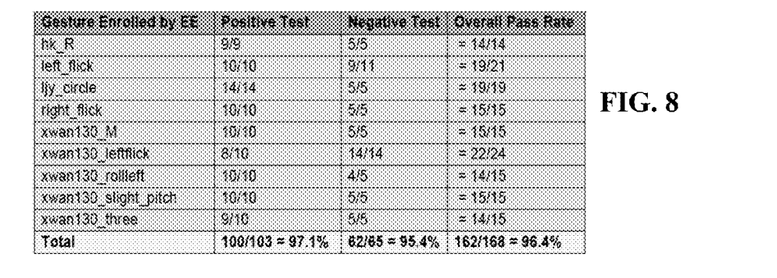
FIG. 8 illustrates one embodiment of test results for a scale invariant mechanism.

According to one embodiment, the gesture enrollment process (i.e., gesture training process) shares a similar flow, except that the distance to the existing neurons 310 (e.g., gesture template) is used to determine a quality of a new enrolled gesture. If the new enrolled gesture is too close to an existing gesture template, has too short of a duration, too weak magnitude, or too small of scale-invariant feature point number, it will not be treated as a high quality user defined gesture. If a new enrolled gesture is distinctively different from the existing neurons (i.e., with large distances), then a new neuron will be added to represent the newly enrolled gesture. At the end of the gesture enrollment process, training vectors are mapped to be set of neurons 310 so that each neuron 310 describes part of a decision space. During training, a set of feature vectors with or without labels are provided to pattern matching hardware 120 as training data to derive the set of neurons representing the entire decision space. FIG. 8 illustrates one embodiment of test results for a scale invariant mechanism. The testing results of this approach for various user defined gestures that are performed. As shown, the overall pass rate reaches 96.4% accuracy. For the Positive Test, a user performs the same gesture as an enrolled version to determine whether the algorithm can correctly recognize the gesture. For the Negative Test, the user performs a gesture other than an enrolled version to determine whether the algorithm correctly rejects the gesture.

Figure 9A:
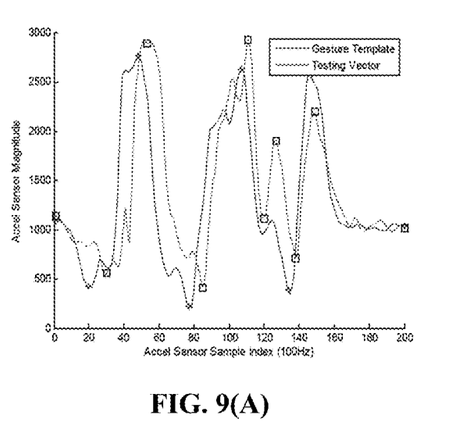
FIGS. 9A-9D illustrate embodiments of sensor data curves.
Figure 9B:
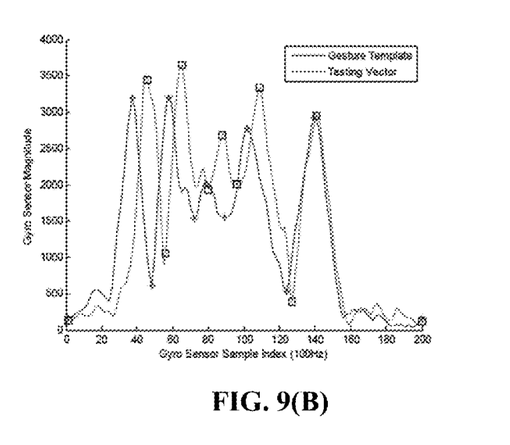
Figure 9C:
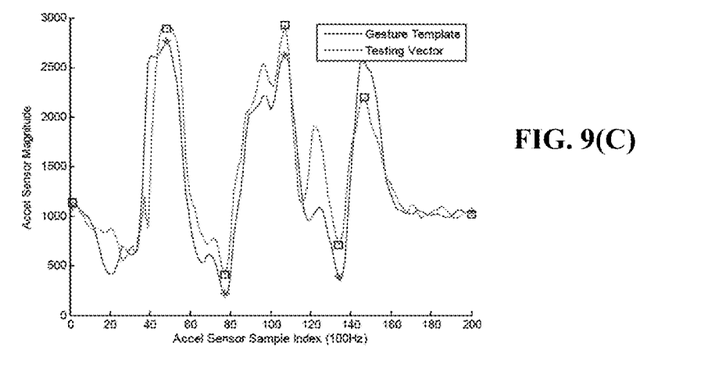
Figure 9D:
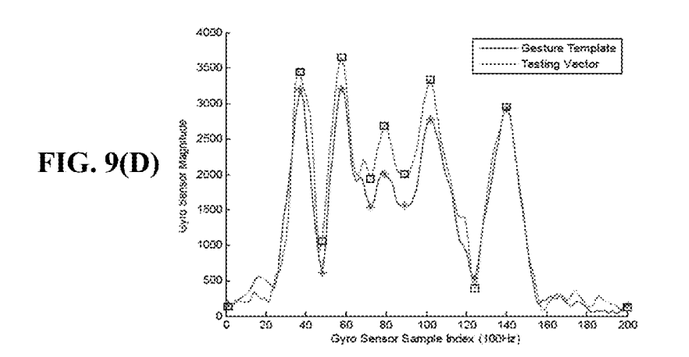

FIGS. 9A-9D illustrate embodiments of sensor data curve for drawing a letter R gesture. FIG. 9A shows an accel sensor magnitude and all the peak valley feature points of a prior art mechanism. Although the curve is very similar between the gesture template and the testing gesture, they do not match due to misalignment of scale-invariant feature points. FIG. 9B shows the same case for a gyro sensor using a prior art mechanism. FIG. 9C shows the accel sensor magnitude after the one-on-one mapping of the most significant peak valley feature points provided by scale invariant mechanism 202. As shown in FIG. 9C, the two curves are now aligned. FIG. 9D shows the same case for the gyro sensor provided by scale invariant mechanism 202. As a result of scale invariant mechanism 202, the error index is reduced from 30% to 16% for accel, and 40% to 14% for gyro. The smaller the number, the more similarity between two curves due to the alignment of the most significant peak valley points.

The above-described scale invariant mechanism consumes significantly less memory, which is an important factor for a wearable device, compared to the dynamic time warping (DTW) approach since it does not require a DTW searching matrix. Moreover, the scale invariant mechanism improves recognition accuracy because of an exact matching of most significant scale-invariant feature points between template and input gesture. Additionally, the scale invariant mechanism provides support for any user-defined motion gesture, and can easily provide a quality indicator for a new enrolled gesture by comparing its distance to the existing templates in a neuron network within a pattern matching hardware, which reduces power consumption.

Figure 10:
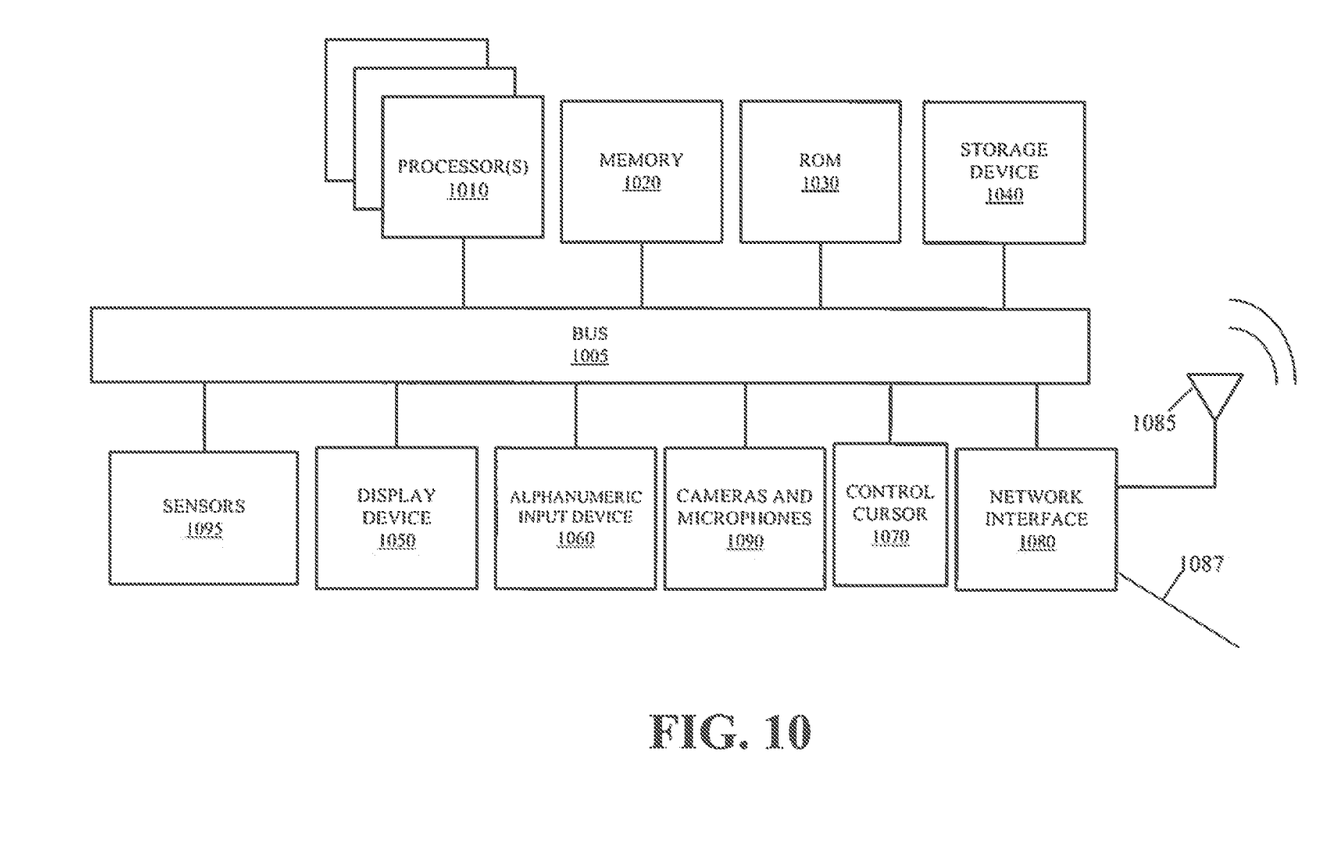
FIG. 10 illustrates one embodiment of a computer system.

FIG. 10 illustrates one embodiment of a computer system 1000. Computing system 1000 includes bus 1005 (or, for example, a link, an interconnect, or another type of communication device or interface to communicate information) and processor 1010 coupled to bus 1005 that may process information. While computing system 1000 is illustrated with a single processor, electronic system 1000 and may include multiple processors and/or co-processors, such as one or more of central processors, graphics processors, and physics processors, etc. Computing system 1000 may further include random access memory (RAM) or other dynamic storage device 1020 (referred to as main memory), coupled to bus 1005 and may store information and instructions that may be executed by processor 1010. Main memory 1020 may also be used to store temporary variables or other intermediate information during execution of instructions by processor 1010.

Computing system 1000 may also include read only memory (ROM) and/or other storage device 1030 coupled to bus 1005 that may store static information and instructions for processor 1010. Date storage device 1040 may be coupled to bus 1005 to store information and instructions. Date storage device 1040, such as magnetic disk or optical disc and corresponding drive may be coupled to computing system 1000.

Computing system 1000 may also be coupled via bus 1005 to display device 1050, such as a cathode ray tube (CRT), liquid crystal display (LCD) or Organic Light Emitting Diode (OLED) array, to display information to a user. User input device 1060, including alphanumeric and other keys, may be coupled to bus 1005 to communicate information and command selections to processor 1010. Another type of user input device 1060 is cursor control 1070, such as a mouse, a trackball, a touchscreen, a touchpad, or cursor direction keys to communicate direction information and command selections to processor 1010 and to control cursor movement on display 1050. Camera and microphone arrays 1090 of computer system 1000 may be coupled to bus 1005 to observe gestures, record audio and video and to receive and transmit visual and audio commands. Sensors 1095 may also be coupled to bus 505 to provide sensory input data to computer system 1000.

Computing system 1000 may further include network interface(s) 1080 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 1080 may include, for example, a wireless network interface having antenna 1085, which may represent one or more antenna(e). Network interface(s) 1080 may also include, for example, a wired network interface to communicate with remote devices via network cable 1087, which may be, for example, an Ethernet cable, a coaxial cable, a fiber optic cable, a serial cable, or a parallel cable.

Network interface(s) 1080 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 1080 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 1080 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 1000 may vary from implementation to implementation depending upon numerous factors, such as price constraints, performance requirements, technological improvements, or other circumstances. Examples of the electronic device or computer system 1000 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate gesture recognition, comprising a sensor array to acquire sensory data, pattern matching hardware having a plurality of neurons to store reference vector data corresponding to user gestures and gesture recognition logic to receive real time signals from the sensor array and to perform gesture recognition using the pattern matching hardware to compare incoming vector data corresponding to the real time signals with the reference vector data.

Example 2 includes the subject matter of Example 1, wherein each neuron evaluates a distance between an incoming vector and a reference vector and returns a positive classification if the distance falls within its current influence field.

Example 3 includes the subject matter of Example 2, wherein the gesture recognition logic comprises pattern matching logic that uses a temporal gradient sequence of the sensory data to determine a signature that is unique for the user gesture.

Example 4 includes the subject matter of Example 3, wherein the pattern matching logic comprises a sensor measurement module to record the sensory data from the sensory array, a training engine to identify a response of the sensor array in order to train for recognition of a body gesture and classification logic to perform gesture classification.

Example 5 includes the subject matter of Example 4, wherein the sensor measurement module performs measurements of sensor amplitude, two-dimension projection, and three-dimension (3D) sensor readings.

Example 6 includes the subject matter of Example 4, wherein the training engine performs down sampling to equalize training sample sizes for gestures, feature extraction and pattern matching to train a classifier.

Example 7 includes the subject matter of Example 6, wherein training of a pattern matching classifier comprises calculating a pairwise distance of training vectors to find a set of reference vectors and their corresponding influence area to represent a decision space.

Example 8 includes the subject matter of Example 7, wherein the training vectors are provided to the neurons, wherein each neuron stores a reference vector for a corresponding category and has an influence area as defined by the distance.

Example 9 includes the subject matter of Example 8, wherein the classification logic searches for a candidate gesture pattern and performs a pattern matching comparison of testing vectors corresponding to the candidate gesture pattern and the reference vectors.

Example 10 includes the subject matter of Example 9, wherein the candidate gesture is classified as a recognized gesture if a distance of the testing vectors from the reference vectors is less than a predetermined threshold.

Example 11 includes the subject matter of Example 2, wherein the gesture recognition logic comprises scale invariant logic to perform a Scale-Invariant Feature Extraction (SIFE) process to enable user-defined gesture recognition.

Example 12 includes the subject matter of Example 11, wherein the scale invariant logic comprises a gesture spotting module to determine an input gesture from sensory data comprises, a SIFE module to extract scale-invariant feature points from the input gesture, a segment based resampling module to select most significant feature points from the input gesture and performs a resample to normalize the input gesture and a knowledge base to store enrolled gestures as templates.

Example 13 includes the subject matter of Example 12, wherein the enrolled gestures are received at the pattern matching hardware.

Example 14 includes the subject matter of Example 12, wherein the pattern matching hardware computes a distance of the normalized input gesture to each neuron.

Some embodiments pertain to Example 15 that includes a method to facilitate gesture recognition, comprising storing reference vector data corresponding to user gestures at a plurality of neurons at pattern matching hardware, receiving real time signals from the sensor array and performing gesture recognition using the pattern matching hardware to compare incoming vector data corresponding to the real time signals with the reference vector data.

Example 16 includes the subject matter of Example 15 wherein gesture recognition is performed using a pattern matching process that uses a temporal gradient sequence of the sensory data to determine a signature that is unique for the user gesture.

Example 17 includes the subject matter of Example 16, the pattern matching process comprises recording the sensory data from the sensory array, training recognition of a body gesture and classifying a gesture.

Example 18 includes the subject matter of Example 17, wherein the training recognition of the body gesture comprises down sampling to equalize training sample sizes for gestures, performing feature extraction and pattern matching to train a classifier.

Example 19 includes the subject matter of Example 18, wherein training the classifier comprises calculating a pairwise distance of training vectors to find a set of reference vectors and their corresponding influence area to represent a decision space.

Example 20 includes the subject matter of Example 18, further comprising providing the training vectors the neurons, wherein each neuron stores a reference vector for a corresponding category and has an influence area as defined by the distance.

Example 21 includes the subject matter of Example 20, wherein classifying the gesture comprises searching for a candidate gesture pattern and performing a pattern matching comparison of testing vectors corresponding to the candidate gesture pattern and the reference vectors.

Example 22 includes the subject matter of Example 21, wherein the candidate gesture is classified as a recognized gesture if a distance of the testing vectors from the reference vectors is less than a predetermined threshold.

Example 23 includes the subject matter of Example 15 wherein gesture recognition is performed using a scale invariant logic to perform a Scale-Invariant Feature Extraction (SIFE) process to enable user-defined gesture recognition.

Example 24 includes the subject matter of Example 23, wherein the scale invariant logic process comprises finding gesture feature points from the sensory data that is invariant to time and magnitude domain scaling, selecting most significant scale-invariant feature points and performing one-on-one mapping between a template gesture and an input gesture corresponding to the gesture feature points.

Example 25 includes the subject matter of Example 24, wherein the scale invariant process further comprises performing segment-based resampling on each of the one-on-one mapped sensor sample segment to obtain a normalized gesture vector with the scale-invariant feature points matched with template.

Some embodiments pertain to Example 26 that includes at least one machine-readable medium comprising a plurality of instructions that in response to being executed on a computing device, causes the computing device to carry out operations comprising storing reference vector data corresponding to user gestures at a plurality of neurons at pattern matching hardware, receiving real time signals from the sensor array and performing gesture recognition using the pattern matching hardware to compare incoming vector data corresponding to the real time signals with the reference vector data.

Example 27 includes the subject matter of Example 26, wherein gesture recognition is performed using a pattern matching process that uses a temporal gradient sequence of the sensory data to determine a signature that is unique for the user gesture.

Example 28 includes the subject matter of Example 26, wherein gesture recognition is performed using a scale invariant logic to perform a Scale-Invariant Feature Extraction (SIFE) process to enable user-defined gesture recognition.

Some embodiments pertain to Example 29 that includes a system comprising a sensor array to acquire sensory data and pattern matching hardware having to perform a pattern matching algorithm based on the sensory data to train a classifier for user gesture recognition.

Example 30 includes the subject matter of Example 29, wherein the pattern matching hardware comprises a pattern matching engine to calculate a distance of training vectors to find a set of reference vectors and a plurality of neurons to store the reference vectors.

Example 31 includes the subject matter of Example 30, wherein the pattern matching hardware performs classification of a gesture based on received sensory data.

Example 32 includes the subject matter of Example 31, wherein the pattern matching engine measures the sensory data and tests a range of measurement windows to verify whether one or more of the measurement windows match one or more reference vectors stored in the neurons.

Example 33 includes the subject matter of Example 32, wherein a gesture is detected if the one or more measurement windows the match one or more reference vectors stored in the neurons.

Some embodiments pertain to Example 34 that includes a method comprising receiving sensory data from a sensor array and performing pattern matching using a temporal gradient sequence of the sensory data to determine a signature that is unique for a user gesture.

Example 35 includes the subject matter of Example 34, wherein the temporal gradient sequence is implemented to train a pattern matching classifier for gesture recognition.

Some embodiments pertain to Example 36 that includes at least one machine-readable medium comprising a plurality of instructions that in response to being executed on a computing device, causes the computing device to carry out operations performed in any of claims 15-24.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions shown in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus to facilitate gesture recognition, comprising: a sensor array to acquire sensory data;
    pattern matching integrated circuit, including:
        a multitude of associative memory neurons, each neuron to store reference vector data corresponding to user gestures and compare incoming vector data with stored reference vector data by evaluating a distance between the incoming vector data and the stored reference vector data; and
        a pattern matching engine to receive data from one or more of the multitude of neurons indicating a best-fit category, the best-fit category being identified by a neuron category ID of a neuron with a closest distance between reference vector data of the neuron and the incoming vector data in comparison to determined distances between reference vectors of other neurons in the multitude of associative memory neurons and the incoming vector data; and
    gesture recognition logic to receive real time signals including the incoming vector data from the sensor array and to perform gesture recognition based on data received from the pattern matching engine, wherein the gesture recognition logic comprises pattern matching logic that comprises
    a sensor measurement module to record the sensory data from the sensor array;
    a training engine to identify a response of the sensor array in order to train for recognition of a body gesture, wherein the training engine is operable to train a pattern matching classifier by, at least in part, calculating a pairwise distance of training vectors to find a set of reference vectors and their corresponding influence area to represent a decision space; and
    classification logic to perform gesture classification.

2. The apparatus of claim 1, wherein each neuron returns a positive classification if the distance falls within a current influence field.

3. The apparatus of claim 2, wherein the gesture recognition logic comprises pattern matching logic that uses a temporal gradient sequence of the sensory data to determine a signature that is unique for the user gesture.

4. The apparatus of claim 1, wherein the sensor measurement module performs measurements of sensor amplitude, two-dimension projection, and three-dimension (3D) sensor readings.

5. The apparatus of claim 1, wherein the training engine performs down sampling to equalize training sample sizes for gestures, feature extraction and pattern matching to train a classifier.

6. The apparatus of claim 1, wherein the training vectors are provided to the neurons, wherein each neuron stores a reference vector for a corresponding category and has an influence area as defined by the distance.

7. The apparatus of claim 6, wherein the classification logic searches for a candidate gesture pattern and performs a pattern matching comparison of testing vectors corresponding to the candidate gesture pattern and the reference vectors.

8. The apparatus of claim 7, wherein the candidate gesture is classified as a recognized gesture if a distance of the testing vectors from the reference vectors is less than a predetermined threshold.

9. The apparatus of claim 2, wherein the gesture recognition logic comprises scale invariant logic to perform a Scale-Invariant Feature Extraction (SIFE) process to enable user-defined gesture recognition.

10. The apparatus of claim 9, wherein the scale invariant logic comprises: a gesture spotting module to determine an input gesture from sensory data comprises; a SIFE module to extract scale-invariant feature points from the input gesture; a segment based resampling module to select most significant feature points from the input gesture and performs a resample to normalize the input gesture.

11. A method to facilitate gesture recognition, comprising: storing reference vector data corresponding to user gestures at a multitude of associative memory neurons at a pattern matching integrated circuit;
receiving real time signals from a sensor array;
performing gesture recognition using the pattern matching integrated circuit, including comparing, at each neuron, incoming vector data included in the real time signals with the stored reference vector data by evaluating a distance between the incoming vector data and the stored reference vector data, wherein gesture recognition is performed using a pattern matching process that comprises
recording the sensory data from the sensory array,
training recognition of a body gesture, wherein training recognition of the body gesture includes training a pattern matching classifier by, at least in part, calculating a pairwise distance of training vectors to find a set of reference vectors and their corresponding influence area to represent a decision space, and
classifying a gesture; and
receiving data from one or more of the multitude of neurons indicating a best-fit category, the best-fit category being identified by a neuron category ID of a neuron with a closest distance between reference vector data of the neuron and the incoming vector data in comparison to determined distances between reference vectors of other neurons in the multitude of associative memory neurons and the incoming vector data.

12. The method of claim 11 wherein gesture recognition is performed using a pattern matching process that uses a temporal gradient sequence of the sensory data to determine a signature that is unique for the user gesture.

13. The method of claim 11, wherein training recognition of the body gesture comprises:
down sampling to equalize training sample sizes for gestures,
performing feature extraction; and
pattern matching to train a classifier.

14. The method of claim 13, further comprising providing the training vectors the neurons, wherein each neuron stores a reference vector for a corresponding category and has an influence area as defined by the distance.

15. The method of claim 14, wherein classifying the gesture comprises: searching for a candidate gesture pattern; and
performing a pattern matching comparison of testing vectors corresponding to the candidate gesture pattern and the reference vectors.

16. The method of claim 15, wherein the candidate gesture is classified as a recognized gesture if a distance of the testing vectors from the reference vectors is less than a predetermined threshold.

17. The method of claim 11 wherein gesture recognition is performed using a scale invariant logic to perform a Scale-Invariant Feature Extraction (SIFE) process to enable user-defined gesture recognition.

18. The method of claim 17, wherein the scale invariant logic process
comprises:
finding gesture feature points from the sensory data that is invariant to time and
magnitude domain scaling;
selecting most significant scale-invariant feature points; and
performing one-on-one mapping between a template gesture and an input gesture
corresponding to the gesture feature points.

19. At least one non-transitory machine-readable medium comprising a plurality of instructions that in response to being executed on a computing device, causes the computing device to carry out operations comprising:
storing reference vector data corresponding to user gestures at a multitude of associative memory neurons at a pattern matching integrated circuit;
receiving real time signals from a sensor array; and
performing gesture recognition using the pattern matching integrated circuit, including comparing, at each neuron, incoming vector data included in the real time signals with the stored reference vector data by evaluating a distance between the incoming vector data and the stored reference vector data, wherein gesture recognition is performed using a pattern matching process that comprises
recording the sensory data from the sensory array,
training recognition of a body gesture, wherein training recognition of the body gesture includes training a pattern matching classifier by, at least in part, calculating a pairwise distance of training vectors to find a set of reference vectors and their corresponding influence area to represent a decision space, and
classifying a gesture, and
receiving data from one or more of the multitude of neurons indicating a best-fit category, the best-fit category being identified by a neuron category ID of a neuron with a closest distance between reference vector data of the neuron and the incoming vector data in comparison to determined distances between reference vectors of other neurons in the multitude of associative memory neurons and the incoming vector data.

20. The at least one machine-readable medium of claim 19, wherein gesture recognition is performed using a pattern matching process that uses a temporal gradient sequence of the sensory data to determine a signature that is unique for the user gesture.

21. The at least one machine-readable medium of claim 19, wherein gesture recognition is performed using a scale invariant logic to perform a Scale-Invariant Feature Extraction (SIFE) process to enable user-defined gesture recognition.

* * * * *